C. L. BAIR.
VEHICLE TOP BOW HOLDER.
APPLICATION FILED JAN. 17, 1916.
1,408,160. Patented Feb. 28, 1922.
2 SHEETS—SHEET 1.
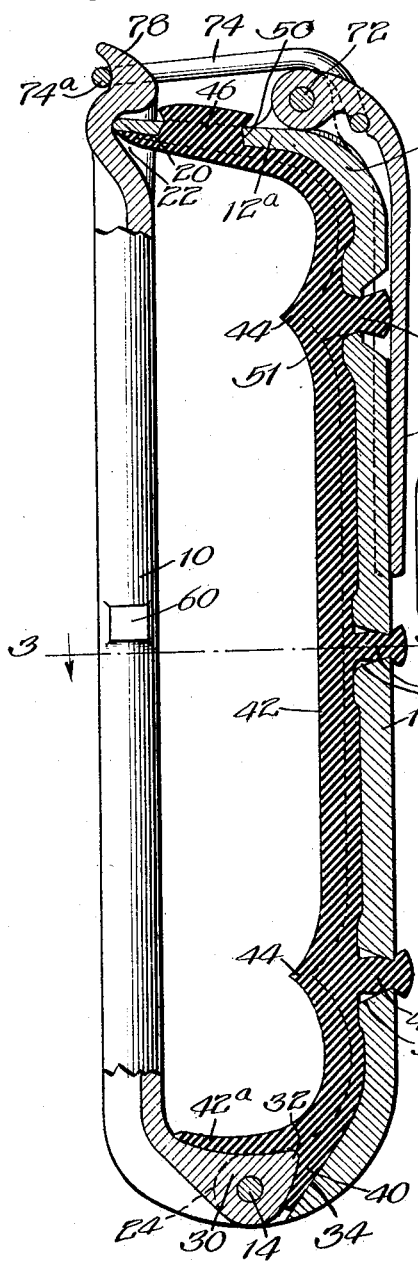
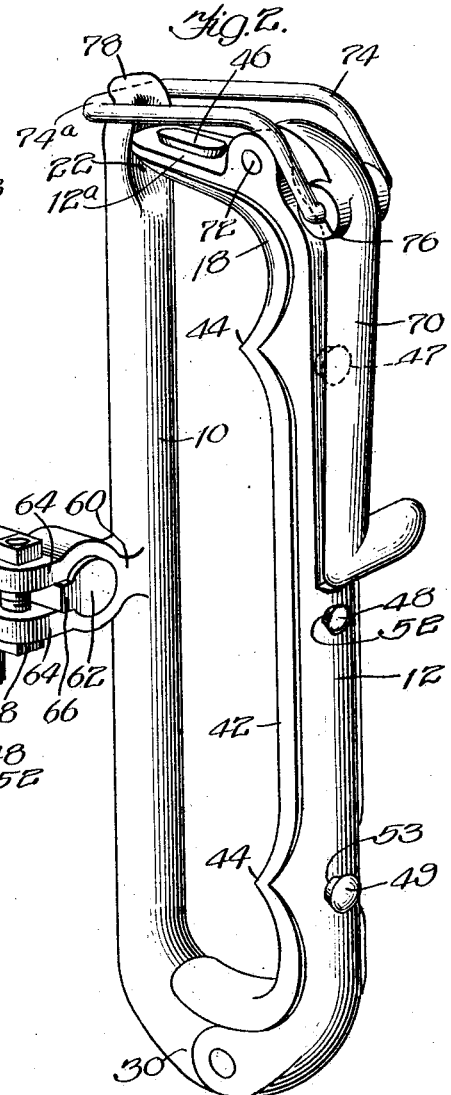
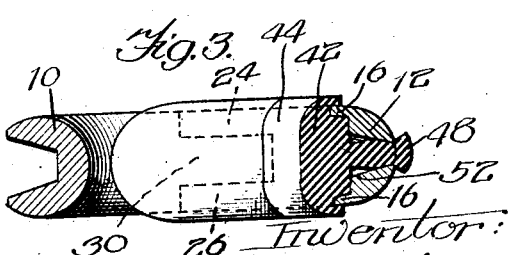
Inventor:
Clarence L. Bair.

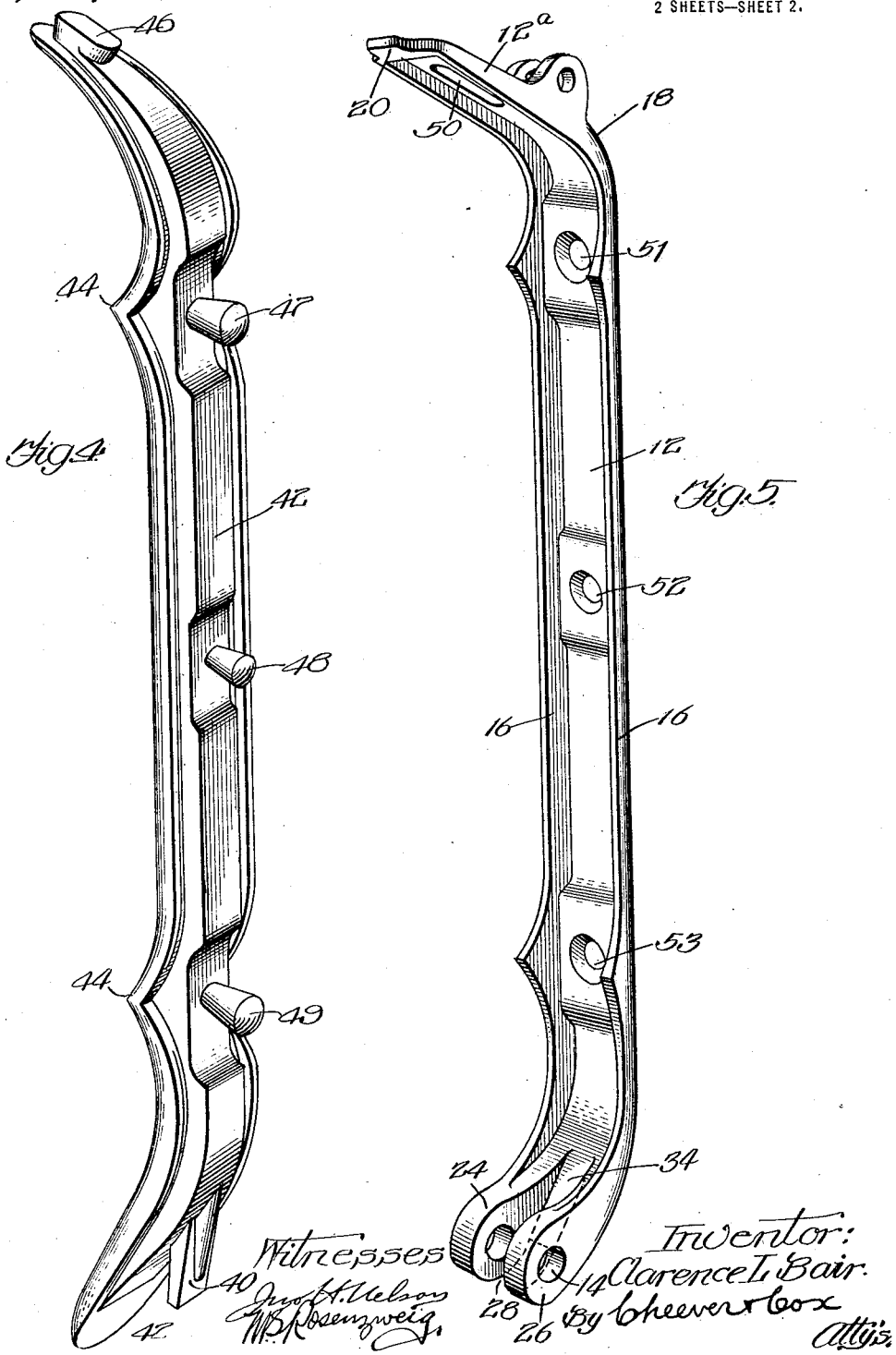

UNITED STATES PATENT OFFICE.

CLARENCE L. BAIR, OF DETROIT, MICHIGAN, ASSIGNOR TO AUTO SPECIALTIES MANUFACTURING CO., OF ST. JOSEPH, MICHIGAN, A CORPORATION OF CALIFORNIA.

VEHICLE TOP-BOW HOLDER.

1,408,160.  Specification of Letters Patent.  Patented Feb. 28, 1922.

Application filed January 17, 1916. Serial No. 72,624.

*To all whom it may concern:*

Be it known that I, CLARENCE L. BAIR, a citizen of the United States, residing at Detroit, in the county of Wayne and State of Michigan, have invented a certain new and useful Improvement in Vehicle Top-Bow Holders, of which the following is a specification.

This invention is an improved vehicle bow top holder of the class shown in my prior Patents, Numbers 866,416, of September 17th, 1907, and 1,010,110, of November 28th, 1911.

The object of the invention is to provide a device of this kind with an improved form of rubber cushion for holding the bows in place; with an improved locking device for detachably securing the stock and movable arm together, and with an improved means for detachably fastening the device to the body of the automobile, or other vehicle, to which it is applied.

The invention consists in a device capable of carrying out the foregoing objects; which can be easily and cheaply made; which is satisfactory in operation, and not readily liable to get out of order. It consists more particularly in the special features and details which will be hereafter more fully set forth in the specification and claims.

Referring to the drawings, in which similar numerals indicate the same parts throughout the several views, Figure 1 is a side view partially in section of mechanism illustrating this invention in its preferred form.

Figure 2 is a perspective view of the device of Figure 1, showing particularly the preferred form of mechanism of this invention for attaching it to the vehicle.

Figure 3 is a sectional plan view on the line 3—3, Figure 1.

Figure 4 is a perspective view of the rubber cushion removed from other parts of the mechanism.

Figure 5 is a perspective view of the movable arm of the device, showing particularly the openings therein in which the rubber cushion of Figure 4 fits.

Broadly speaking, the device, illustrated in the drawings, includes a stock member 10 and an arm 12, the two pivoted together at their bottoms at 14 and detachably secured together at their tops by the mechanism shown in the drawings, performing the same general function as that of my said prior patents; viz., holding a plurality of bows of a vehicle top (not shown) in place between the stock and arm.

In a device of this type, one of the problems is to provide on the stock or arm a lining of cushioning material adapted to bear against the vehicle top bows without substantial friction thereon, and to so secure this cushioning device in place that it cannot readily be detached when in use. In solving this problem, the arm 12 is preferably made of channel-shape cross-section with flanges 16 extending in a general way toward the stock 10, while the arm itself is bent at 18 so as to provide the horizontally extending channel-shaped arm 12$^a$ reaching over to and bearing against the stock through the agency of the tooth 20 entering a suitably formed recess 22 in the upper end of the stock 10. In addition to this, the arm 12 is peculiarly hinged to the stock 10 by providing upon the channel flanges 16 of the arm 12 enlarged separated lugs 24 and 26, having between them the recess 28 in which a central hinged lug 30 on the stock enters. This last mentioned lug 30 is not, as usual, semi-cylindrical in form but is provided with a projecting toe 32, clearly appearing in Figure 1, the parts being, however, so shaped that in all positions of the stock and arm there is a triangular shaped space existing between this member 30 on the stock and the inner face 34 of the recess 28, in which recess or space the rubber tongue 40, hereafter described, always fits and lies.

The cushioning device for the arm 12 consists in the rubber cushion member 42, illustrated in section in Figure 1 and in perspective in Figure 4, the same being provided on its face which is adjacent to the stock 10 with a plurality of ribs or ridges 44 adapted to enter more or less between the adjacent bows of the top which is to be held, and space them apart. This rubber cushion is secured in place on the arm 12 by being provided with a plurality of inverted conical lugs 46, 47, 48 and 49, as well as the projecting tongue 40, heretofore described. These lugs 46, 47, 48 and 49 enter suitably located holes 50, 51, 52 and 53 formed in the arm 12. When the rubber cushion is separated from the arm 12, as shown in Figures 4 and 5, the bases of these lugs 46 to 49 adjacent to the body of the cushion proper are of substantially the same diameter as the respective holes 50 to 53 inclusive in which they are designed to fit, while the outer diameters of the lugs remote from the body of the cushion 42 are of substantially larger size, but of such a size that when compressed by pressure, the lugs can be driven through the holes in which they are respectively intended to fit, with the result that when the parts are assembled, as shown in Figure 1, the cushion can only be removed from the arm 12 by a much greater pulling pressure tending to move the cushion from the position shown in Figure 1 towards the stock 10 than is ever possible of existence in practice. The result of this construction is that the cushion is held on the arm much more securely and permanently than it is possible to hold it by means heretofore used, including cementing or gluing which has heretofore been extensively used.

In addition to the foregoing, the cushion 42 is provided with a tail-piece 42ª which, as clearly shown in Figure 1, extends over the hinge device right up to the vertical wall of the stock 10, this tail-piece being held in place by the entrance of the tongue 40 into the recess provided for it, as heretofore described. This construction effectually holds this tail-piece 42ª in place in all positions of movement of the arm 12 with reference to the stock 10.

From the foregoing, it will be seen that the bottom of the lowermost bow enclosed within the device of this invention rests upon and is protected by the tail-piece 42ª; the sides of all the bows bear against the cushion 42, while the uppermost bow is engaged by the portion of the cushion 42 which carries the lug 46 and lies on the under-side of the part 12ª of the arm, all this protection being accomplished by one piece of rubber or other cushion material, it being obvious that other cushion material than rubber may be used without departing from this invention.

In order to more effectively secure this bow holder to the vehicle than has heretofore been possible, the device is provided with a lug 60 extending from the stock 10, the same being made with a U-shaped recess, as shown in Figure 2, the bottom of the U-shaped recess being cylindrical to receive a stationary cylindrical lug 62 attached to or extending from the vehicle body, and the upper portions of this U-shaped recess being made with parallel sides 64 to receive a non-circular extension 66 on the side of the lug 62. The sides of this lug are detachably securable in place by a bolt 68. The result of this construction is that when bolt 68 is tightened the side members of the lug clamp the member 66 and all rotation of the device about the cylindrical member 62 is prevented.

The novel form of device for detachably securing the arm 12 to the stock 10 includes a hand lever 70 pivoted to the arm 12 at 72, and a spring link member 74 pivoted to the lever 70 at 76 intermediate between the ends of said lever, while the opposite end of the link 74ª is adapted to embrace a hood or other similar projection 78 on the end of stock 10. The arm 70 is so shaped that when the parts are in the position shown in Figures 1 and 2, the pivotal center 76 is below the line drawn through the pivot 72 and the point 74ª thereby insuring locking of the device. When the handle 70 is swung in a counter-clockwise direction until the pivot point 72 lies above the line just described, the hold of the link 74 is released and the outer end of the link may be swung off from the hook 78. This device has the advantage of being very effective in action and also in being much more accessible for ready use than constructions in which the securing device is mounted wholly on the stock 10 in proximity to the vehicle body. It has the further advantage that the securing device just described is carried by the arm 12 wholly away from the stock 10 as the bow holder is open, and it is, therefore, entirely out of the path of the vehicle top bows moving in the ordinary manner into the bow holder.

It will be further observed that by mounting the link 74 on the lever 70 I render it possible to effect complete locking operation of the device with the use of but a single hand, leaving the other hand free for use in forcing the bows down into a compact cluster. When the spacing extension or member 12ª is used in connection with the arrangement of the link 74 and the lever 70 just referred to, it not only performs its original function of serving as a spacing member but in addition acts as a guide to determine when the arm 12 is moved sufficiently near the stock 10 to permit certain and positive engagement of the link 74 with the upper end of the stock. In other words the use of the member 12ª in the arrangement of parts previously defined eliminates to a large degree the possibility of trial and failure in the locking operation.

Having thus described my invention, what I claim as new and desire to secure by Letters Patent, is:—

1. In a device of the class described, the combination of a stock and arm lying at a distance from each other and hinged together, and a cushion member applied to one of said first mentioned members provided with the end portion which extends over and protects the hinge portions of the stock and member; there being a member attached to the cushion interfitting with the parts of the hinge between the stock and arm to retain the cushion device in position at that point.

2. In a device of the class described, the combination of a stock and arm lying at a distance from each other and hinged together, and a cushion member applied to one of said first mentioned members provided with an end portion which extends over and protects the hinge portions of the stock and member, there being a tongue of cushion material extending from the cushion into a recess formed and maintained in the hinge device between the stock and arm to retain the cushion in position at that point.

3. In a vehicle bow holder, the combination of a stock, an arm having one end hinged to the stock, a rigid member projecting from the other end of the arm for engagement with the stock to space said arm and stock, a lever pivoted to the arm, and a catch pivoted to the lever engageable with the stock when the arm is disposed in bow holding position and operating to clamp the stock and arm together as the lever is moved toward the arm.

4. In a vehicle bow holder, the combination of a stock, an arm having one end hinged to the stock, a rigid member projecting from the other end of the arm for engagement with the stock to space said arm and stock, a lever pivoted to the arm, and a link pivoted to the lever for movement to embracing relation with respect to the stock when the arm is disposed in bow holding position and operating to clamp the stock and arm together as the lever is moved toward the arm.

5. In a vehicle bow holder, the combination of a stock, an arm having one end hinged to the stock, a rigid member projecting from the other end of the arm for engagement with the stock to space said arm and stock, a lever pivoted to the arm, and a link pivoted to the lever intermediate the ends of the latter for movement to embracing relation with respect to the stock when the arm is disposed in bow holding position and operating to clamp the stock and arm together as the lever is moved toward the arm.

6. A device of the character described, comprising a stock arranged to be attached to a vehicle body, an arm hinged to one extremity of said stock, an operating lever pivotally mounted upon the free extremity of said arm and a link carried by said lever and adapted to engage said stock to clamp the bows of a top between said stock and said arm.

7. A device of the character described, comprising a stock arranged to be attached to a vehicle body, an arm hinged to said stock, an operating lever pivotally mounted upon said arm and a link carried by said lever and adapted to engage said stock to clamp the bows of a top between said stock and said arm.

In witness whereof, I have hereunto subscribed my name in the presence of two witnesses.

CLARENCE L. BAIR.

Witnesses:
CARRIE M. SANFORD,
IDA BAIR.